(12) United States Patent
Yamamoto

(10) Patent No.: US 7,466,555 B2
(45) Date of Patent: Dec. 16, 2008

(54) CARD CONNECTOR ASSEMBLY HAVING CARD MISINSERTION PREVENTIVE STRUCTURE

(75) Inventor: Eiji Yamamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 145 days.

(21) Appl. No.: 11/416,081

(22) Filed: May 3, 2006

(65) Prior Publication Data

US 2006/0250778 A1    Nov. 9, 2006

(30) Foreign Application Priority Data

May 9, 2005    (JP)    ............................. 2005-135511

(51) Int. Cl.
*H05K 1/14*    (2006.01)
(52) U.S. Cl. ........................ 361/737; 361/679; 361/728; 439/57; 439/325
(58) Field of Classification Search ................. 361/737, 361/679, 728, 736, 683, 686; 439/152, 153, 439/57, 325, 55
See application file for complete search history.

(56) References Cited

U.S. PATENT DOCUMENTS 5,815,479 A * 9/1998 Lee ............................ 720/647
6,120,322 A * 9/2000 Ho et al. .................... 439/541.5
6,368,123 B2 * 4/2002 Uchiyama et al. ........... 439/138
6,666,724 B1 * 12/2003 Lwee .......................... 439/630

FOREIGN PATENT DOCUMENTS

| JP | 06-084567 | 3/1994 |
| JP | 09-266028 | 10/1997 |
| JP | 2001-250631 | 9/2001 |

\* cited by examiner

*Primary Examiner*—Tuan T Dinh
*Assistant Examiner*—Hung S Bui
(74) *Attorney, Agent, or Firm*—Crowell & Moring LLP

(57) ABSTRACT

A card connector assembly having a card misinsertion preventive structure has: a front cover placed in front of two card connectors double-decked up and down, each having an insertion opening; a shutter pivotally supported by the front cover; and a pivotal shaft. The shutter has two lengthwise parallel planes perpendicularly intersecting each other in L-shaped cross-section. In the absence of a card inserted in any of the card connectors, the shutter allows any one of the two insertion openings to be open to the front of the front cover to enable insertion of a card from outside into any one card connector. When a card is inserted in one card connector, the shutter covers the insertion opening of the other card connector to prevent insertion of a further card from outside into the other card connector. This prevents, in advance, a connection error, thereby preventing discomfort to the user.

8 Claims, 4 Drawing Sheets

CARD CONNECTOR ASSEMBLY HAVING CARD MISINSERTION PREVENTIVE STRUCTURE

BACKGROUND OF THE INVENTION

1. Field of the Invention

The present invention relates to a card connector assembly which is double-decked with a combination of two card connectors, e.g. upper and lower, to insert a card from outside, and which has a card misinsertion preventive structure.

2. Description of the Related Art

Generally, in electronic apparatus such as a printer, a card connector is used into which a card such as a semiconductor memory card is inserted from outside. Such electronic apparatus has a controller for controlling the connection between the card connector and the card inserted in the card connector so as to make it possible, for example, to read data recorded on the card.

Conventionally, in such electronic apparatus, a card misinsertion preventive structure having e.g. a shutter provided at the insertion opening of a card connector has been proposed to prevent a foreign object from being inserted into the card connector from outside. For example, Japanese Laid-open Patent Publication Hei 9-266028 discloses a card misinsertion preventive structure for a card connector, in which an elongated rectangular-shaped shutter is pivotally mounted on a holder of the card connector. The shutter closes or covers the insertion opening of the card connector in the absence of a card inserted in the card connector so as to prevent a foreign object from entering the card connector.

It is to be noted here that there are various standards for cards, and cards vary in e.g. shape and number of contacts for respective standards. Accordingly, card connectors have various shapes depending on the card standards. Thus, some of the electronic apparatus have a double-decked card connector assembly having upper and lower card connectors so as to be adaptable to multiple different card standards. However, for the purpose of cost reduction, such electronic apparatus may have only one controller for controlling the connection between a card and the card connector assembly. More specifically, when a card is inserted into either one of the upper and lower card connectors, the controller controls the connection between the card and the card connector having the card inserted therein. Since only one controller is present, it is not possible to control connections between the card connector assembly and multiple (two) cards at the same time.

This causes a problem because it is possible to insert multiple cards into the card connector assembly at the same time, regardless of the presence or absence of a shutter, for the following reason. First assume that no shutter is provided on either one of the card connectors (first and second card connectors) in the card connector assembly. Under this assumption, even if a card is inserted into a first card connector, the insertion opening of a second card connector is open, so that a further or second card can be inserted into the second card connector from outside. Next assume that shutters, each as disclosed in the above-described Patent Publication, are provided on the respective card connectors in the card connector assembly. In this case, the shutters should be assumed to be independently provided on the card connectors so as to be independently openable and closable. Under this assumption also, even if a first card is inserted into a first card connector, it is possible to insert a second card into a second card connector.

If two cards can be inserted at the same time into both card connectors of a card connector assembly in an electronic apparatus having only one controller, a user may misunderstand that both cards can be connected to both card connectors at the same time, even though the electronic apparatus has only one controller. Actually, however, only one card inserted into one card connector can be connected to the one card connector. This may cause misinsertion of cards. If a second card is erroneously inserted into a second card connector after a first card is inserted into a first card connector, it causes a connection error with the second card, and the controller does not function with the second card. This connection error provides discomfort to the user, and impairs comfort in using the electronic apparatus.

SUMMARY OF THE INVENTION

An object of the present invention is to provide a card connector assembly having a card misinsertion preventive structure to prevent a second card from being inserted from outside into a second card connector when a first card is inserted in a first card connector, so as to prevent, in advance, a connection error, thereby preventing discomfort to the user.

According to the present invention, this object is achieved by a card connector assembly having a card misinsertion preventive structure, the card connector assembly comprising: a combination of two card connectors, each with an insertion opening facing front to insert a card from outside; a front cover placed in front of the combination of the card connectors and having a slot means provided corresponding to positions of the insertion openings of the card connectors, respectively, so as to enable a card to be inserted into respective one of the card connectors from the front through the slot means; and a shutter which has two planes intersecting each other substantially perpendicularly, and which is placed between the front cover and the combination of the card connectors so as to be pivotal around a pivot axis provided at or near the intersection of the two planes. In the absence of a card inserted in any one of the card connectors, the shutter allows any one of the insertion openings of the card connectors to be open to the front of the front cover so as to make it possible to insert a card from outside into any one of the card connectors through the slot means, while when a card is inserted in one of the card connectors, the shutter covers the insertion opening of the other one of the card connectors so as to prevent insertion of a further card from outside into the other one of the card connectors. The card connector assembly according to the present invention prevents, in advance, a connection error, thereby preventing discomfort to the user.

Preferably, in order to position the shutter, the shutter further has positioning protrusions which are provided on both lengthwise ends thereof, and which are brought in contact with the front cover or the combination of the card connectors. The positioning protrusions prevent the shutter, when pivoted, from moving to the front out of the front surface of the front cover, thereby giving a better appearance of the card misinsertion preventive structure of the card connector assembly than without the positioning protrusions.

Further preferably, the combination of the card connectors is double-decked up and down, and the slot means has two slots provided at upper and lower rows of the front cover corresponding to the positions of the insertion openings of the double-decked combination of the card connectors, respectively, while the shutter has a substantially L-shaped cross-section, and is supported to be pivotal up and down at a rear surface of the front cover between the front cover and the combination of the card connectors with a bent portion of the substantially L-shaped cross-section serving as a pivot axis extending substantially horizontally. This facilitates the prevention, in advance, of a connection error, thereby preventing discomfort to the user.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
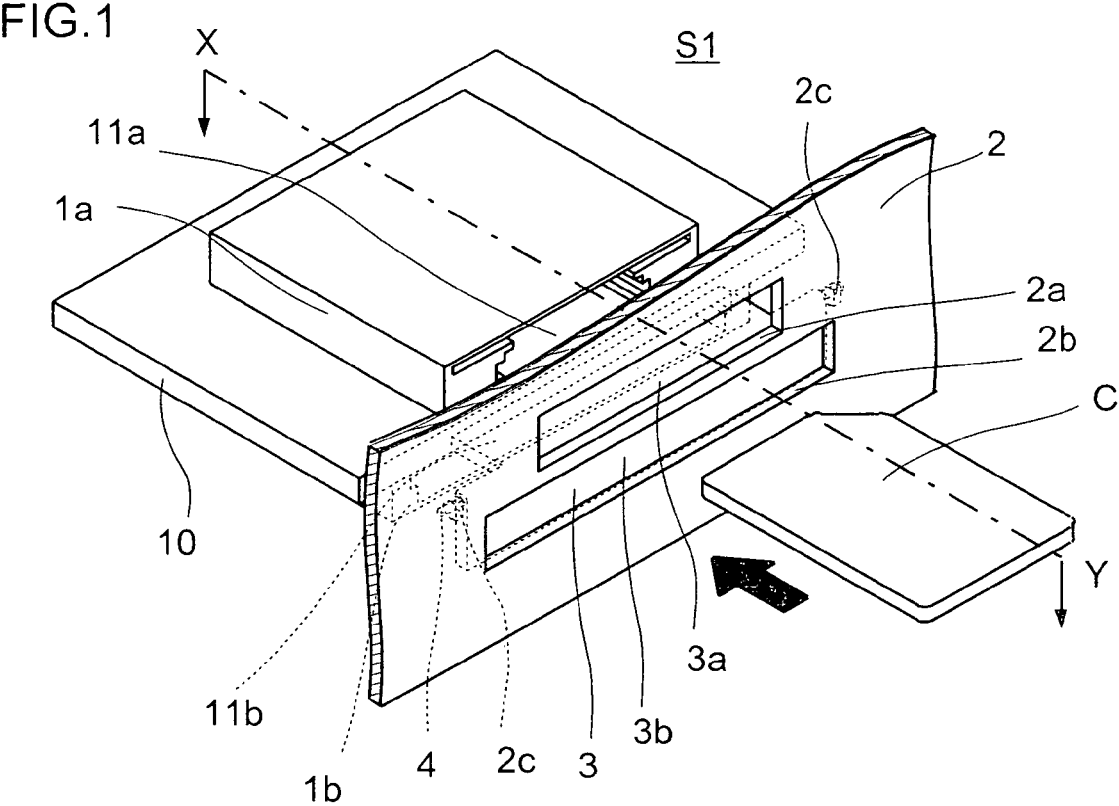
FIG. 1 is a schematic perspective view of a card connector assembly according to a first embodiment of the present invention.

The best modes and preferred embodiments of the present invention will be described hereinafter with reference to the annexed drawings. The specific embodiments described are not intended to cover the entire scope of the present invention, and hence the present invention is not limited to only the specific embodiments. Note that like parts are designated by like reference numerals or reference characters throughout the drawings.

Figure 2:
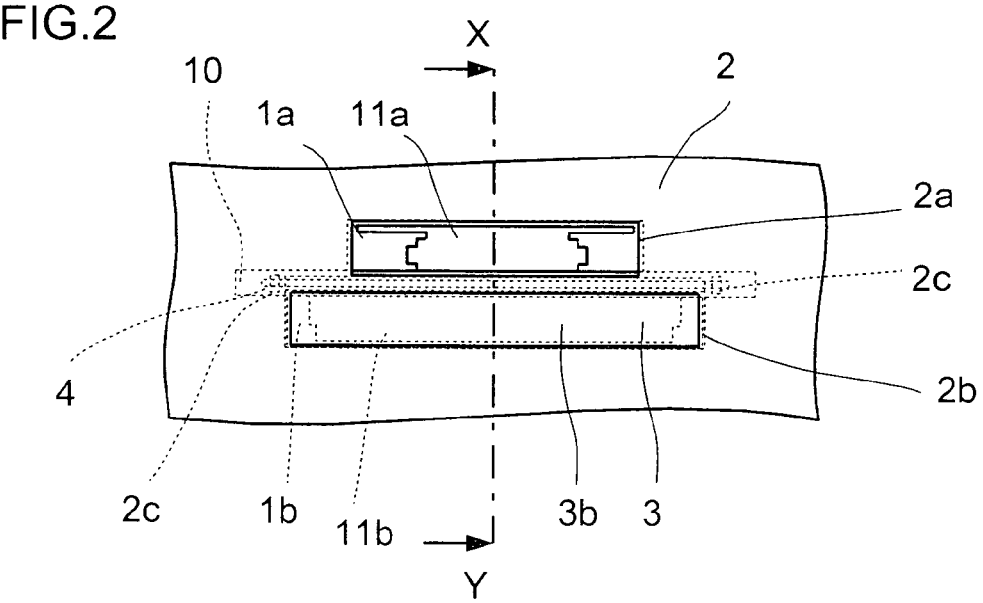
FIG. 2 is a schematic front view of the same card connector assembly.
Figure 3:
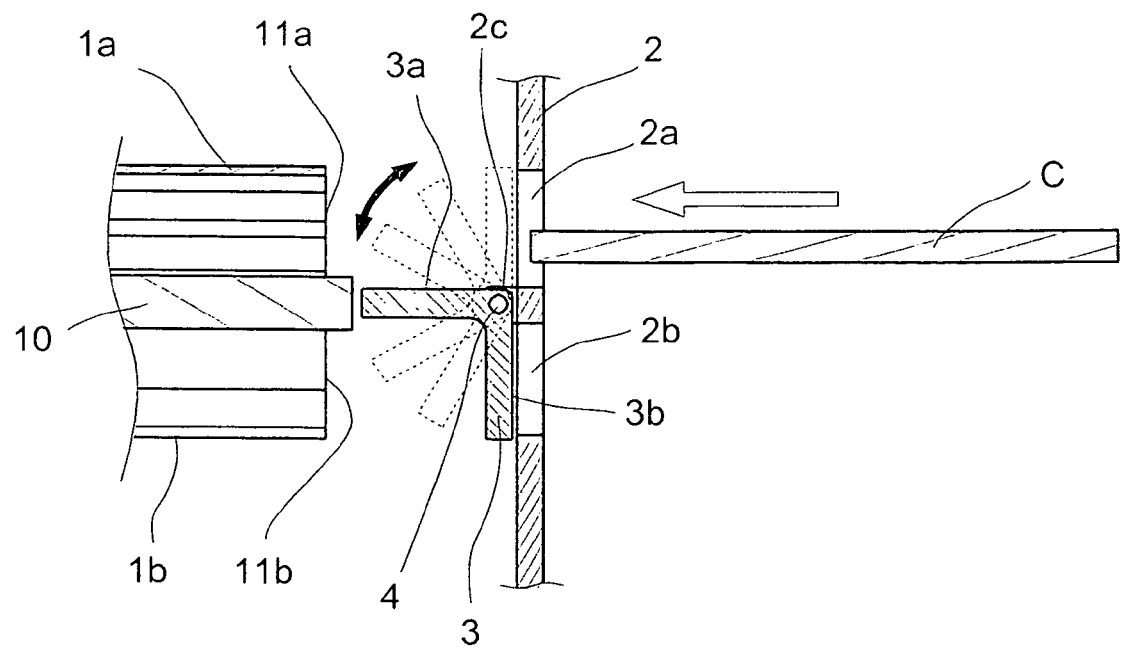
FIG. 3 is a schematic cross-sectional side view of a part of the same card connector assembly taken along line X-Y shown in FIGS. 1 and 2.

Referring to FIGS. 1 to 4 and FIGS. 5A to 5C, a card connector assembly S1 having a card misinsertion preventive structure according to a first embodiment of the present invention will be described hereinafter. FIG. 1 is a schematic perspective view, and FIG. 2 is a schematic front view, of the card connector assembly S1, while FIG. 3 is a schematic cross-sectional side view of a part of the card connector assembly S1 taken along line X-Y shown in FIGS. 1 and 2. A card misinsertion preventive structure is provided in a card connector assembly S1 which is double-decked with a combination of two card connectors 1a and 1b, e.g. upper and lower, and comprises a front cover 2 placed in front of the card connectors 1a and 1b, a shutter 3 pivotally supported by the front cover 2, and a pivotal shaft 4. The card connectors 1a and 1b respectively have insertion openings 11a and 11b to insert a card thereinto, and are respectively provided on a top surface and a bottom surface of a base plate 10 so as to be double-decked, up and down, with the insertion openings 11a and 11b facing the front cover 2.

According to the present embodiment, the upper card connector 1a is assumed to be adapted to multiple card standards such as SD (Secure Digital) Memory Card(™), MultiMediaCard(™), SmartMedia(™), MemoryStick(™) and xD-Picture Card(™), while the lower card connector 1b is assumed to be adapted to multiple card standards such as CompactFlash(™) and Microdrive(™). However, such card standards are not the only ones applicable to the card connectors 1a and 1b. Note that the card connector assembly S1 of the card connectors 1a and 1b is to be mounted in an electronic apparatus such as a printer, such that when a card is inserted into the card connector assembly S1, the electronic apparatus can read e.g. data recorded on such card.

The front cover 2 is provided in front of the insertion openings 11a and 11b of the card connectors 1a and 1b, and serves to prevent the card connectors 1a and 1b as well as the base plate 10 from being exposed outside. That is, the front cover 2 can be said as a part of a housing of an electronic apparatus in which the card connectors 1a and 1b are mounted. In the present embodiment, the front cover 2 has slots 2a and 2b provided at upper and lower rows, more specifically corresponding to the positions of the respective insertion openings 11a and 11b. The widths of the cards for the card connector 1b to be adapted to are larger than those for the card connector 1a to be adapted to, so that the slot 2b is designed to have a length (lateral dimension) larger than that of the slot 2a, but is not limited thereto.

The provision of the slots 2a and 2b enables a card (card C) to be inserted into respective one of the card connectors 1a and 1b from the front through respective one of the slots 2a and 2b, as shown by the large black arrow in FIG. 1 and the large white arrow in FIG. 3. In the present specification, the combination of the slots 2a and 2b is referred to also as a slot means, considering that a single slot 2a described later in the second embodiment, which can also be referred to as a slot means, is equivalent in function to the combination of the slots 2a and 2b here.

The front cover 2 has two shaft support members 2c which pivotally support the shutter 3, and which are provided on a rear surface of the front cover 2 at positions between the slots 2a and 2b (slot means) and on the same horizontal level. In the present embodiment, the positions at which the two shaft support members 2c are provided are spaced from each other by a distance greater than the length (lateral dimension) of the shutter 3, and also greater than the length of the slot 2b. The shaft support members 2c are provided on and stand on the rear surface of the front cover so as to support a shaft 4 passing through the shutter 3 as will be described later.

Figure 4:
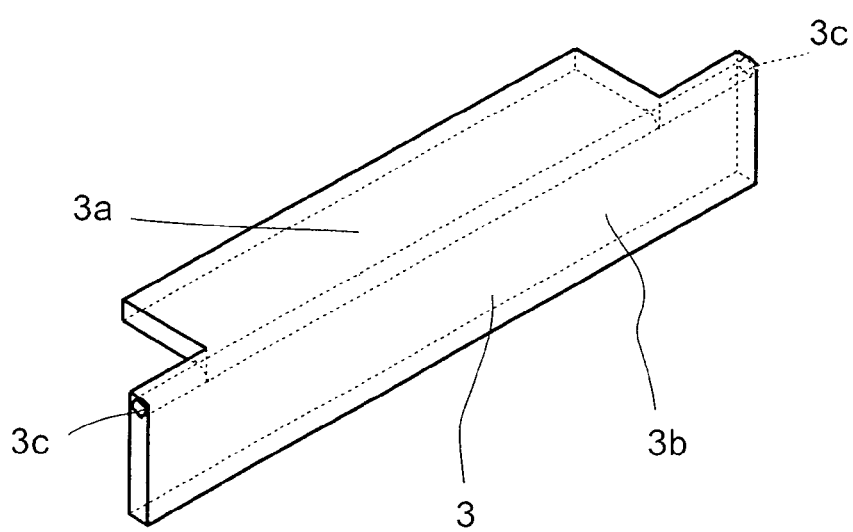
FIG. 4 is a schematic perspective view of a shutter to be used in the same card connector assembly.

FIG. 4 is a schematic perspective view of a shutter 3 to be used in the card connector assembly S1 according to the present embodiment. As shown in FIG. 4, the shutter 3 has two planes 3a and 3b to form a substantially L-shaped cross-section, which are parallel to the lengthwise direction, and which substantially perpendicularly intersect each other. In the present embodiment, one plane 3a of the two planes 3a and 3b of the shutter 3 has a length (lateral dimension) slightly greater than the length (lateral dimension) of the slot 2a, and has a width (longitudinal dimension) slightly greater than the width (longitudinal dimension) of the slot 2a. Similarly, the other plane 3b of the shutter 3 has a length slightly greater than the length of the slot 2b, and has a width slightly greater than the width of the slot 2b. Thus, as shown in FIG. 4, the plane 3a is shorter in length (lateral dimension) than the plane 3b. Note, however, that the dimensional relationship between the two planes 3a and 3b is not limited thereto. For example, the two planes 3a and 3b can have the same length.

The shutter 3 has a shaft hole 3c laterally (lengthwise) penetrating therethrough at or near where the two planes 3a and 3b intersect, namely at a bent portion of the substantially L-shaped cross-section thereof. The shutter 3 is placed between the front cover 2 and the combination of the card connectors 1a and 1b in a manner that the shaft 4 is inserted into the shaft hole 3c, and that the shaft 4 is supported by the shaft support members 2c. Since the shaft 4 is supported by the shaft support members 2c, the shutter 3 is pivotally supported at the rear surface of the front cover 2 with the bent portion serving as a pivot axis (for the shutter 3 to pivot around) extending substantially horizontally in parallel to the front or rear surface of the front cover 2, and is supported in a substantially horizontal posture.

Thus, as shown by the curved doubled-headed black arrow in FIG. 3, the shutter 3 is supported to be pivotal up and down between the front cover 2 and the combination of the card connectors 1a and 1b. While pivotally supported as described above, the shutter 3 pivots downward with gravity, whereby the plane 3b of the shutter 3 is brought in contact with the rear surface of the front cover 2 near the slot 2b as shown in FIG. 3. At this time, the slot 2b is covered by the plane 3b of the shutter 3 at the rear of the front cover 2.

Figure 5:
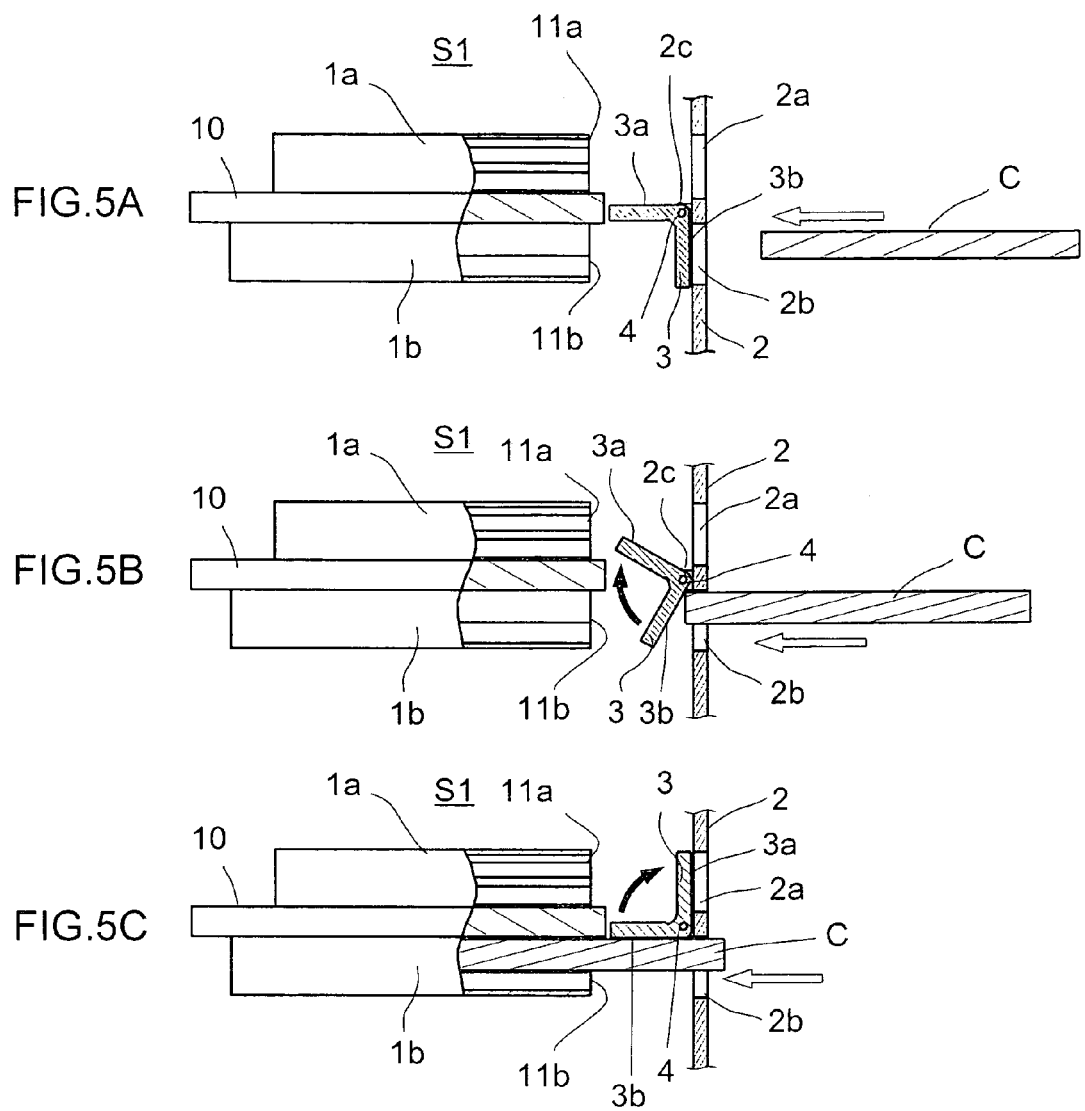
FIGS. 5A to 5C are schematic cross-sectional side views of the same card connector assembly taken along line X-Y shown in FIGS. 1 and 2, and respectively show states of the same card connector assembly before, when and after a card is inserted into one card connector.

Next, referring to FIGS. 5A to 5C, an operation of inserting a card C from outside into the card connector 1a or 1b according to the present embodiment will be described. FIGS. 5A to 5B are schematic cross-sectional side views of the card connector assembly S1 taken along line X-Y shown in FIGS. 1 and 2, and respectively show states of the card connector assembly S1 before, when and after the card C is inserted into the card connector 1b. As described above, the plane 3b of the shutter 3 covers the slot 2b at the rear of the front cover 2 with gravity in the absence of a card inserted in any one of the card connectors 1a and 1b as shown in FIG 5A.

First, it will be described how a card C is inserted into the card connector 1b through the slot 2b. When the card C is moved toward the slot 2b and the card connector 1b in a direction shown by the while arrow in FIG. 5A, the front end of the card C is going to pass through the slot 2b. More specifically, the front end of the card C is first brought in contact with the plane 3b of the shutter 3 which covers the slot 2b. When the card C is further moved in the same direction, the plane 3b of the shutter 3 is pushed by the front end of the card C so that the shutter 3 starts pivoting in a direction shown by the curved black arrow in FIG. 5B. Thereafter, when the shutter 3 further pivots upward to cause the insertion opening 11b of the card connector 1b to be open as seen from the front of the front cover 2, the card C can be, and is, inserted into the card connector 1b as shown in FIG. 5C. At this time, the slot 2a is covered by the plane 3a of the shutter 3 at the rear of the front cover 2.

In this state, a portion of the plane 3b of the shutter 3 is in contact with a top surface of the card C, so that the shutter 3 cannot pivot downward. Accordingly, even if an attempt is made to insert a further card (second card) into the card connector 1a through the slot 2a in this state, the shutter 3 prevents such further card from being inserted thereinto, because the insertion opening 11a of the card connector 1a is kept closed or covered by the plane 3a of the shutter 3. The card C or the further card can be inserted into the card connector 1a through the slot 2a after the card C inserted in the card connector 1b is removed therefrom to make the shutter 3 pivotal again.

Next, it will be described how the card C is inserted into the card connector 1a through the slot 2a. In the absence of a card inserted in any one of the card connectors 1a and 1b, the insertion opening 11a of the card connector 1a is open to the front of the front cover 2. Thus, the card C can be inserted into the card connector 1a without being in contact with the plane 3a of the shutter 3. When the card C is inserted into the card connector 1a, a portion of the plane 3a of the shutter 3 is brought in contact with a bottom surface of the card C, so that the shutter 3 cannot pivot upward. Accordingly, even if an attempt is made to insert a further card (second card) into the card connector 1b through the slot 2b in this state, the shutter 3 prevents such further card from being inserted thereinto, because the insertion opening 11b of the card connector 1b is kept closed or covered by the plane 3b of the shutter 3. The card C or the further card can be inserted into the card connector 1b through the slot 2b after the card C inserted in the card connector 1a is removed therefrom to make the shutter 3 pivotal again.

As described in the foregoing, in the absence of a card inserted in any one of the card connectors 1a and 1b, the shutter 3 allows any one of the insertion openings 11a and 11b of the card connectors 1a and 1b to be open to the front of the front cover 2 so as to make it possible to insert a card from outside into any one of the card connectors 1a and 1b. On the other hand, when a card is inserted in one of the card connectors 1a and 1b, the shutter 3 covers the insertion opening 11b or 11a of the other one of the card connectors 1b and 1a so as to prevent insertion of a further or second card from outside into the other one of the card connectors 1b and 1a.

That is, when a card is inserted in one of the card connectors 1a and 1b, the card connector assembly S1 with this card misinsertion preventive structure including the shutter 3 prevents a further or second card from being inserted from outside into the other one of the card connectors 1b and 1a. Thus, the card connector assembly S1 makes it possible to securely prevent misinsertion of cards, preventing two cards from being inserted in both card connectors 1a and 1b at the same time. In this way, the card misinsertion is prevented, so that even if only one controller is provided for both card connectors 1a and 1b, the controller can be prevented from generating a connection error. Since connection error does not occur, discomfort to the user due to the connection error can be prevented.

Figure 6:
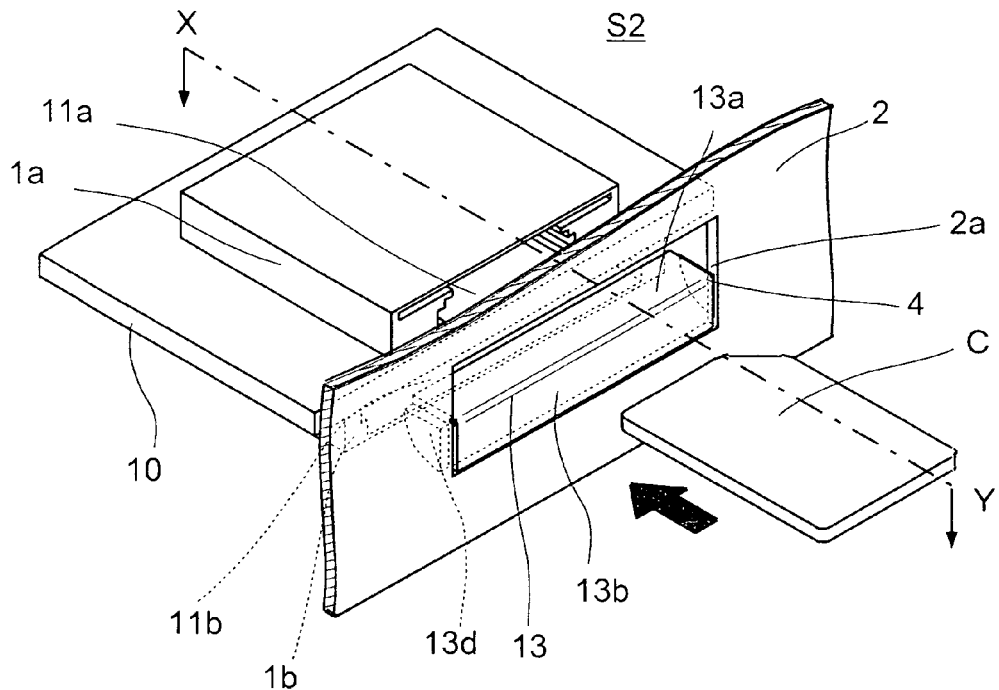
FIG. 6 is a schematic perspective view of a card connector assembly according to a second embodiment of the present invention.
Figure 7:
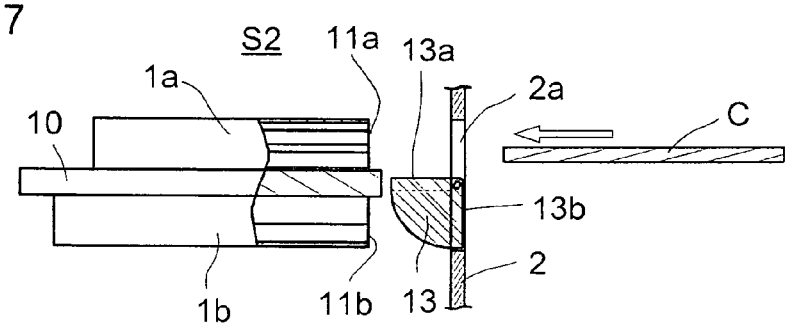
FIG. 7 is a schematic cross-sectional side view of the same card connector assembly taken along line X-Y shown in FIG. 6.
Figure 8:
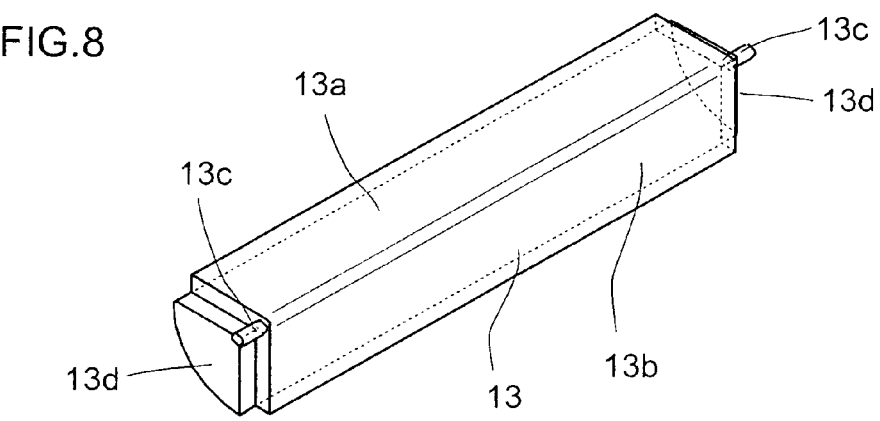
FIG. 8 is a schematic perspective view of a shutter to be used in the same card connector assembly.

Referring now to FIGS. 6 to 8, a card connector assembly S2 having a card misinsertion preventive structure according to a second embodiment of the present invention will be described hereinafter. FIG. 6 is a schematic perspective view of the card connector assembly S2 including a shutter 3 and a front cover 2, and FIG. 7 is a schematic cross-sectional side view of the card connector assembly S2 taken along line X-Y shown in FIG. 6, while FIG. 8 is a schematic perspective view of the shutter 13. Note that like parts in the first and second embodiments are designated by like reference numerals or reference characters throughout the drawings. The present second embodiment is different from the first embodiment mainly in the shape of the front cover 2 and the shutter 13, so that different portions will be described mainly.

In the card connector assembly S2 of the present embodiment, the front cover 2 has one slot 2a (slot means) at a position corresponding to the position of the combination of the card connectors 1a and 1b, more specifically corresponding to the positions of the insertion openings 11a and 11b of the respective card connectors 1a and 1b. This slot 2a has a size (length and width) to allow both insertion openings 11a and 11b to be open to the front therethrough. That is, a card C can be inserted into any one of the card connectors 1a and 1b through this slot 2a. Further, although not shown, the front cover 2 has two shaft support members which are provided at substantially the midpoints of opposite (left and right) vertical inner walls of the slot 2a, respectively, and which support the shutter 13 as will be described in detail later.

Referring to FIG. 8, the shutter 13 has two laterally (lengthwise) parallel planes 13a and 13b which intersect each other substantially perpendicularly. The shutter 13 has a substantially quarter circular-shaped cross-section as shown in FIG. 7, but the shape is not limited thereto. According to the present embodiment, the two planes 13a and 13b of the shutter 13 have a length (lateral dimension) slightly smaller than the length (lateral dimension) of the slot 2a, and have a width or thickness (widthwise dimension) substantially half of the width (longitudinal dimension) of the slot 2a.

The shutter 3 has laterally (lengthwise) and oppositely projecting shaft segments 13c provided at or near the intersection of, and on both lateral (lengthwise) ends of, the two planes 13a and 13b, respectively. The shaft segments 13c of the shutter 13 are pivotally supported by the above-described shaft support members (not shown) whereby the shutter 13 is placed partially inside the slot 2a of the front cover 2 so as to be pivotal up and down with the shaft segments 13c serving as a pivot axis (for the shutter 13 to pivot around) which horizontally extends in parallel to the front or rear surface of the front cover 2, as shown in FIG. 6 and FIG. 7.

The shutter 13 further has positioning protrusions 13d which are provided on the both lengthwise ends (lateral ends) thereof, and which are brought in contact with the periphery of the slot 2a of the front cover 2 when the shutter 13 is placed on the front cover 2 as described above. The positioning protrusions 13d are provided in order to position the shutter 13. More specifically, the positioning protrusions 13d are formed to limit the pivotal range of the shutter 13 in a manner to prevent the shutter 13 from moving to the front out of the front surface of the front cover 2 by the contact between the front cover 2 and the positioning protrusions when the shutter 13 is pivotally supported by the front cover 2. In the present embodiment, it is designed so that when the shutter 13 pivots up or down to bring the positioning protrusions 13d to a limit position within the pivotal range, either one of the planes 13a and 13b becomes parallel to the front surface of the front cover 2, but it is not limited to such design.

When the shutter 13 is pivotally supported by the front cover 2, either one of upper and lower halves of the slot 2a becomes covered by the shutter 13 as shown, for example, in FIG. 7 which shows the case where the shutter 13 covers the lower half of the slot 2a. While the shutter 13 covers the lower half of the slot 2a, the insertion opening 11a of the card connector 1a is open to the outside. In contrast, while the shutter 13 covers the upper half of the slot 2a, the insertion opening 11b of the card connector 1b is open to the outside.

Thus, due to the two planes 13a and 13b which intersect each other substantially perpendicularly, the card connector assembly S2 prevents card misinsertion in a manner similar to that of the card connector assembly S1. More specifically, in the absence of a card inserted in any one of the card connectors 11a and 11b, the shutter 13 allows any one of the insertion openings 11a and 11b of the card connectors 1a and 1b to be open to the front of the front cover 2 so as to make it possible to insert a card into any one of the card connectors 1a and 1b from outside through the slot 2a (slot means). On the other hand, when a card is inserted in one of the card connectors 1a and 1b, the shutter 13 covers the insertion opening 11b or 11a of the other one of the card connectors 1b and 1a so as to prevent insertion of a further or second card from outside into the other one of the card connectors 1b and 1a.

In this way, the card connector assembly S2 with the card misinsertion preventive structure having the shutter 13 makes it possible to securely prevent misinsertion of cards, preventing two cards from being inserted in both card connectors 1a and 1b at the same time. Thus, the card misinsertion is prevented, so that even if only one controller is provided for both card connectors 1a and 1b, the controller can be prevented from generating a connection error, thereby preventing discomfort to the user due to the connection error, in a manner similar to that of the card connector assembly S1.

Furthermore, although in the present embodiment, the two planes 13a and 13b of the shutter 13 are smaller than the size of the slot 2a (slot means), the positioning protrusions 13d which are provided on the shutter 13, and which are brought in contact with the front cover 2, prevent the shutter 13, when pivoted, from moving to the front out of the front surface of the front cover 2. This gives a better appearance of the card misinsertion preventive structure of the card connector assembly S2 than without the positioning protrusions 13d.

It is to be noted that the present invention is not limited to the above embodiments, and various modifications are possible within the spirit and scope of the present invention. For example, each of the double-decked card connector assemblies S1 and S2 can be rotated by 90 degrees around a central axis thereof perpendicular to the front surface thereof shown e.g. in FIG. 2 so as to change or cause the upper and lower card connectors 1a and 1b to be left and right (or right and left) card connectors with insertion openings 11a and 11b each having its longitudinal length greater than its lateral width, and also so as to cause the pivot axis of each of the shutters 3 and 13 to vertically extend in parallel to the front or rear surface of the front cover 2, and further so as to cause the length of the slot means to extend vertically. Such modified card connector assemblies can operate to prevent card misinsertion, similarly as in the card connector assemblies S1 and S2, in a manner that each of the shutters 3 and 13 pivots left and right around the vertically extending pivot axis.

Furthermore, in place of the shaft support members provided on the front cover 2 in each of the card connector assemblies S1 and S2, the combination of the card connectors 1a and 1b can have shaft support members provided thereon. For example, two shaft support members can be provided at left and right positions of the top surface of the base plate 10, respectively, which are left and right of the left and right vertical side walls of the card connector 1a in a manner that each of the two shaft support members projects from the front surface of the combination of the card connectors 1a and 1b by a distance greater than the width of the shutter 3 or 13 so as to support a pivot axis (shaft) which horizontally extends in parallel to the front or rear surface of the front cover 2, and around which the shutter 3 or 13 pivots up and down in the same pivot direction as in the card connector assemblies S1 and S2. In each of such modified card connector assemblies also, the shutter 3 or 13 can pivot between the front cover 2 and the combination of the card connectors 1a and 1b so as to prevent card misinsertion similarly as in the card connector assemblies S1 and S2.

In the case of the latter modified card connector assembly, which is modified from the card connector assembly S2 having the shutter 13 so that the combination of the card connectors pivotally supports the shutter, the positioning protrusions are to be provided or formed to limit the pivotal range of the shutter in a manner similar to the case of the card connector assembly S2, but by contact between a portion of the combination of the card connectors and the protrusions. This contact between them to limit the pivotal range of the shutter also gives a better appearance of the card misinsertion preventive structure of the latter modified card connector assembly than without the positioning protrusions.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A card connector assembly having a card misinsertion preventive structure, the card connector assembly comprising:
   a combination of two card connectors, each with an insertion opening facing front to insert a card from outside;
   a front cover placed in front of the combination of the card connectors and having a slot means provided corresponding to positions of the insertion openings of the card connectors, respectively, so as to enable a card to be inserted into respective one of the card connectors from the front through the slot means; and
   a shutter which has two planes intersecting each other substantially perpendicularly, and which is placed between the front cover and the combination of the card connectors so as to be pivotal around a pivot axis provided at or near the intersection of the two planes, the shutter being pivotally supported by the front cover,
   wherein in the absence of a card inserted in any one of the card connectors, the shutter allows any one of the insertion openings of the card connectors to be open to the front of the front cover so as to make it possible to insert a card from outside into any one of the card connectors through the slot means, while when a card is inserted in one of the card connectors, the shutter covers the insertion opening of the other one of the card connectors so as to prevent insertion of a further card from outside into the other one of the card connectors.

2. The card connector assembly according to claim 1, wherein in order to position the shutter, the shutter further has positioning protrusions which are provided on both lengthwise ends thereof, and which are brought in contact with the front cover or the combination of the card connectors.

3. The card connector assembly according to claim 1, wherein:
   the combination of the card connectors is double-decked up and down;
   the slot means has two slots provided at upper and lower rows of the front cover corresponding to the positions of the insertion openings of the double-decked combination of the card connectors, respectively; and
   the shutter has a substantially L-shaped cross-section, and is supported to be pivotal up and down at a rear surface of the front cover between the front cover and the combination of the card connectors with a bent portion of the substantially L-shaped cross-section serving as a pivot axis extending substantially horizontally.

4. The card connector assembly according to claim 1, wherein when the card is inserted in one of the card connectors, one of the two planes of the shutter is substantially parallel with the slot means corresponding to the position of the insertion opening of the other one of the card connectors.

5. The card connector assembly according to claim 1, wherein when the card is inserted in one of the card connectors, one of the two planes of the shutter is substantially parallel with the slot means corresponding to the position of the insertion opening of the other one of the card connectors, and the one of the two planes is in contact with a rear surface of the front cover.

6. The card connector assembly according to claim 1, wherein when the card is inserted in one of the card connectors, one of the two planes of the shutter is substantially parallel with the inserted card.

7. The card connector assembly according to claim 1, wherein when the card is inserted in one of the card connectors, one of the two planes of the shutter is substantially parallel with the inserted card, and the other one of the two planes is in contact with a rear surface of the front cover.

8. The card connector assembly according to claim 1, wherein when the card is inserted in one of the card connectors, one of the two planes of the shutter is in contact with the inserted card, and the other one of the two planes is in contact with a rear surface of the front cover.

* * * * *